United States Patent [19]

Shuey et al.

[11] Patent Number: 4,500,837

[45] Date of Patent: Feb. 19, 1985

[54] DETECTION OF DC CONTENT IN AN AC WAVEFORM

[75] Inventors: Kenneth C. Shuey, Cridersville; Charles L. Doughman, Shawnee Township, Allen County, both of Ohio

[73] Assignee: Westinghouse Electric Corp., Pittsburgh, Pa.

[21] Appl. No.: 225,226

[22] Filed: Jan. 15, 1981

[51] Int. Cl.[3] ............. G01R 19/00; H04B 15/00; H02P 13/20
[52] U.S. Cl. ................. 324/102; 307/520; 324/103 P; 324/107; 328/165; 363/96; 363/97; 364/575
[58] Field of Search ............. 324/102, 111, 119, 107, 324/103 P; 307/353, 520; 328/151, 165, 166, 167, 150; 330/9, 149; 363/96, 97, 98, 46; 364/575, 734

[56] References Cited

U.S. PATENT DOCUMENTS

| | | | |
|---|---|---|---|
| 1,746,935 | 2/1930 | Goodwin, Jr. | 324/119 |
| 2,624,770 | 1/1953 | Yetter | 324/102 |
| 3,510,753 | 5/1970 | Lawn | 363/46 |
| 3,988,689 | 10/1976 | Ochi et al. | 307/353 |
| 4,305,132 | 12/1981 | Tsuboshima et al. | 455/63 |

Primary Examiner—Ernest F. Karlsen
Attorney, Agent, or Firm—R. P. Lenart

[57] ABSTRACT

The DC content of each phase of a three phase AC waveform is generated by partially filtering each phase and applying the filtered waveforms sequentially through a multiplexer to a sample and hold circuit which measures the instantaneous value of each phase at two points which are spaced an exact odd number of half-cycles apart. These instantaneous values are fed by an analog to digital converter into a microprocessor which averages the two readings to generate the DC content for each phase and compares the highest DC content with a threshold value. The excess of the highest DC content over the threshold value is integrated and an output signal is generated when the accumulated volt-seconds exceed a selected value.

8 Claims, 6 Drawing Figures

DETECTION OF DC CONTENT IN AN AC WAVEFORM

BACKGROUND OF THE INVENTION

1. Field of the Invention

This invention relates to methods and apparatus for determining the DC content in an AC waveform and has particular application to determining the DC content in the AC waveforms generated by single or multiphase inverters.

2. Description of the Prior Art

It is often important or desirable to determine the presence and the magnitude of any DC content in an AC waveform. Such a DC component is often generated in inverters where differences in the characteristics of the paired electronic switches generating the AC waveform result in the generation of a DC component in the inverter output. This DC component, if excessive, can cause extremely high DC circulating currents in AC loads such as motors and transformers. Hence, the DC content must be controlled and also sensed by protection circuits in the event that the controls fail.

It is known to sense the DC content in an inverter output by applying the AC waveform to series connected operational amplifier integrators which attenuate the AC component and amplify the DC component. Since the DC component can be positive or negative, the output of the integrators is applied to a full wave rectifier bridge and the rectified signal is compared with both positive and negative reference voltages. In a multiphase system, the line to neutral voltage of each phase is passed through a pair of integrators with the intergrator outputs all being applied to the full wave rectifier bridge. In this manner, a positive or negative output signal is generated if a DC content of either polarity in any of the phases exceeds the preset limits.

It is an important object of the present invention to provide methods and apparatus for DC content sensing which are less complex, and less costly than those offered by the prior art. Other objects of the invention will become evident from the discussion which follows.

SUMMARY OF THE INVENTION

According to the present invention, the DC content of an AC waveform is determined by measuring and storing the instantaneous value of the AC waveform at a first point in a cycle. A second measurement of the instantaneous value of the waveform is then made at a point spaced from the first point by substantially an exact odd number of waveform half-cycles. By thus measuring the value of the waveform at two instants when it is an equal amount above and below the mid value, the average of the two instantaneous measured values will determine the average value of the waveform and hence the DC content. This method for determining the DC content is independent of the point in the waveform pattern when the first measurement is made. The only requirement is that the second measurement be taken at substantially an exact, odd number of half-cycles after the first measurement. Of course, the fewer the number of half-cycles between the measurements, the less chance there is that errors will be introduced due to variations in the magnitude or frequency of the waveform. In the embodiment of the invention to be described in detail, the second measurement is made 7 half-cycles after the first which leaves little time for the introduction of such errors.

The invention embraces not only the method of detecting the DC content in an AC waveform, but also apparatus for carrying out the method. In the preferred embodiment of the invention, the means for measuring the instantaneous value of the waveform includes a sample and hold circuit which is controlled by a digital processor to sample the waveform at the two instants in time separated by an exact, odd number of waveform half-cycles. The sampled values are converted into digital form for insertion into the digital processor by an analog to digital converter. The first value is stored by the processor for averaging with the second value to generate a signal representative of the DC content. If desired, this DC content signal can be compared with a threshold signal to generate an output signal only when the DC content exceeds the threshold. Additionally, the amount by which the DC content exceeds the threshold can be integrated and the output signal generated only after the accumulated volt seconds exceeds a selected amount.

In applying the invention to the detection of DC content in a multiphase AC waveform, the instantaneous value of each phase is measured in sequence at a first point in a cycle and stored. A second measurement is then made at a second point in each phase which is spaced in time by substantially an exact odd number of half-cycles from the point at which the first measurement was made. The first and second values for each phase are then averaged sequentially. In the embodiment of the invention to be described in detail, the DC content of greatest magnitude is then determined and used as described above to generate an output signal.

DESCRIPTION OF THE PREFERRED EMBODIMENT

Figure 1:
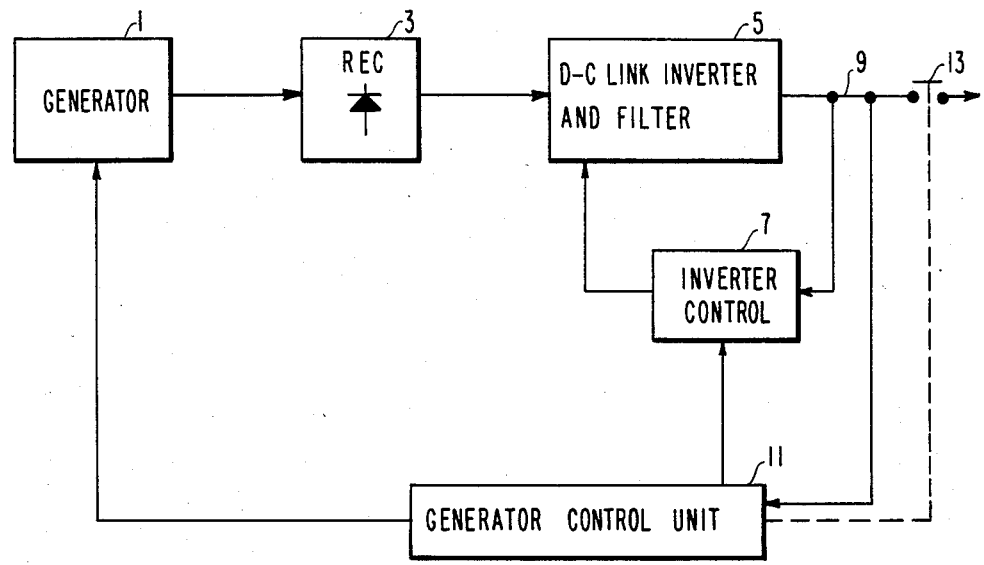
FIG. 1 is a schematic diagram in block diagram form of a DC link inverter system incorporating the present invention.

Although the present invention could be used in many applications where it is desired to determine the DC content of an AC waveform, it will be described as applied to the inverter system illustrated in FIG. 1. In this system, the three phase AC voltage produced by a generator 1 driven by a prime mover (not shown) is rectified in full wave rectifier 3 and applied to a DC link inverter and filter 5. The electronic switches of the inverter are controlled by an inverter control 7 to generate a three phase AC output voltage of a desired frequency on bus 9. A generator control unit 11 monitors inverter operation and terminates operation of the inverter control unit 7, shuts down the generator 1 and disconnects the load from the inverter by opening the disconnect 13 if prescribed operating limitations are exceeded. One of these operating limitations is the DC content of the AC waveform generated on bus 9.

A system such as that shown in FIG. 1, is used for instance in an aircraft electric power generating system to generate a three phase AC voltage at constant frequency, commonly 400 hertz, from an AC generator which is driven at varying rpm, by the aircraft engine. A detailed description of a suitable DC link inverter and filter 5 and inverter control 7 is set forth in the commonly owned, copending U.S. patent application of Kenneth C. Shuey and Mark A. Rosswurm entitled "Microprocessor Control of Inverter Power Transistors with DC Content Control" and identified as assignee case Ser. No. 225,225 filed 1/15/81 which is hereby incorporated by reference into this application for the purpose of disclosing a complete system. While the waveform generator of this referenced system includes means for controlling the DC content in the inverter output, it is still desirable to provide separate DC content sensing in the generator control unit in the event that the waveform generator is not successful in maintaining the DC content within limits.

Figure 2:
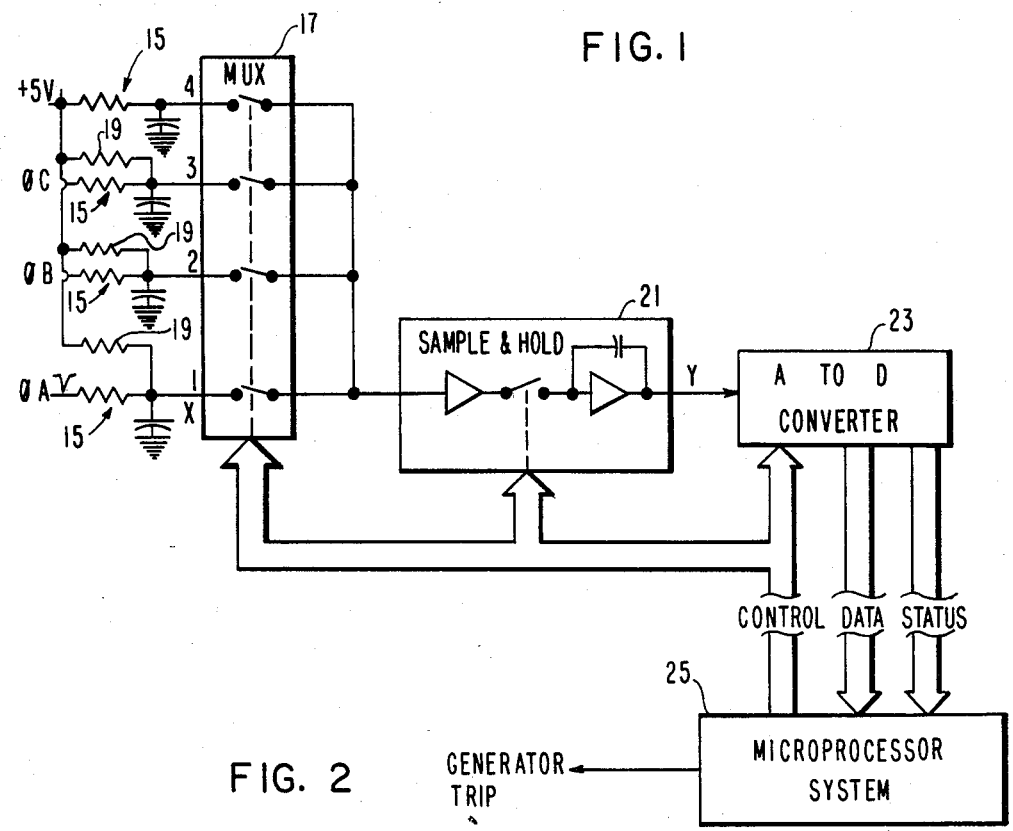
FIG. 2 is a schematic diagram of a portion of the system illustrated in FIG. 1 constructed in accordance with the teachings of the present invention.

FIG. 2 discloses the portion of the generator control unit 11 in FIG. 1 which monitors the DC content of the waveform appearing on the 3 phase bus 9. Each line to neutral voltage is applied through an R-C filter 15 to an input of a multiplexer 17. A 2.5 volt DC bias voltage is added to each filtered line to neutral voltage by applying a +5 volts across a voltage divider formed by a resistor 19 and the resistor of the R-C filter 15. The +5 volts is also applied to a fourth input of the multiplexer 17 through another R-C filter 15. The output of the multiplexer 17 is connected to a sample and hold circuit 21 which in turn is connected to an analog to digital converter 23. A microprocessor system 25 through its control outputs operates the multiplexer to selectively apply the line to neutral voltages and the 5 volt reference voltage one at a time to the sample and hold circuit 21. The microprocessor system also operates sample and hold circuit 21 to momentarily store the instantaneous value of the applied waveform at a selected instant and directs the analog to digital converter to generate a digital representation of the stored voltage. The analog to digital converter reports its status to the microprocessor so that the digital data can be inputted to the microprocessor upon completion of the conversion process. The microprocessor then operates upon the data to determine the DC content of each phase of the inverter voltage and generates a generator trip signal when prescribed limits for the DC content are exceeded. Suitable examples of components for the circuit of FIG. 2 include an AD 7501 multiplexer, an AD 582 sample and hold unit, an AD 571 10 bit analog to digital converter and an Intel 8085 microprocessor system.

Figure 3:
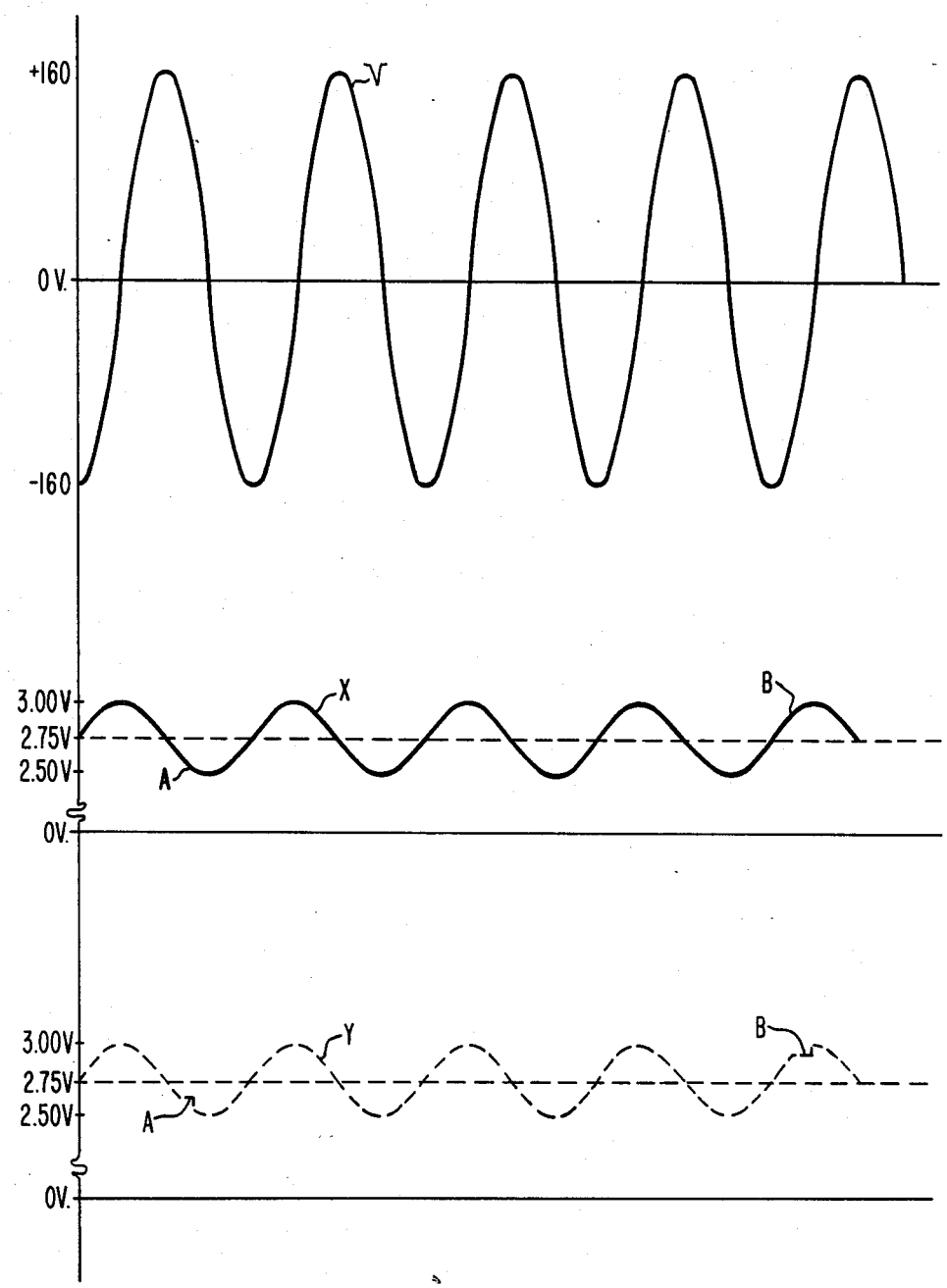
FIG. 3 illustrates waveforms which are generated at selected points in the portion of the system illustrated in FIG. 2.

The operation of the circuits of FIG. 2 can best be understood by referring to the waveforms of FIG. 3. The topmost waveform "v" represents the inverter line to neutral voltage such as the phase A voltage applied to the circuit of FIG. 2. The DC component is not apparent in this waveform due to the large 400 hertz common mode component. However, the filters 15 attenuate the 400 hertz components of the line to neutral voltages while providing unity gain for the DC components. The waveform "x", which represents in enlarged scale the filtered input to the multiplexer appearing at point X in FIG. 2, is the DC component of the input voltage with the 400 hertz ripple voltage super-imposed and with the +2.5 volt bias added in.

The present invention is based upon the fact that the DC component is equal to the average value of the waveform "x" and that this value can be determined by averaging the instantaneous value of the waveform at two discrete points which are substantially an exact odd number of half-cycles apart. For example, the average value of the waveform "x" in FIG. 2 is shown to be 0.25 v (+2.75 minus the 2.5 volt bias). This can be determined by adding the instantaneous value of the waveform at point A, 2.50 volts, to the instantaneous value at the point B, 3.0, dividing the sum by 2 and subtracting the 2.5 volt bias. It is immaterial at what point in the cycle the first measurement is taken and it does not matter how many odd cycles later the second measurement is taken as long as the elapsed time between the two is small compared to the time period over which measurable changes occur in the waveform. In the example shown, the second measurment is taken 7 half-cycles after the first. For the 400 hertz system described, 8.75 milliseconds elapse between the readings. The bias voltage is added into the filtered waveform so that the A to D converter only has to handle positive voltages and to simplify the manipulation of the data as will be discussed below.

The instantaneous values of the waveforms at points A and B are measured through the sample and hold circuit. The output waveform generated by the sample and hold circuit is represented by the waveform "y" in FIG. 3. Only the solid portions of the waveform "y" at points A and B actually appear at the output of the sample and hold circuit since the multiplexer 17 under the control of the microprocessor 25 only applies each input voltage to the sample and hold circuit during the intervals when measurements are to be taken.

Figure 4:
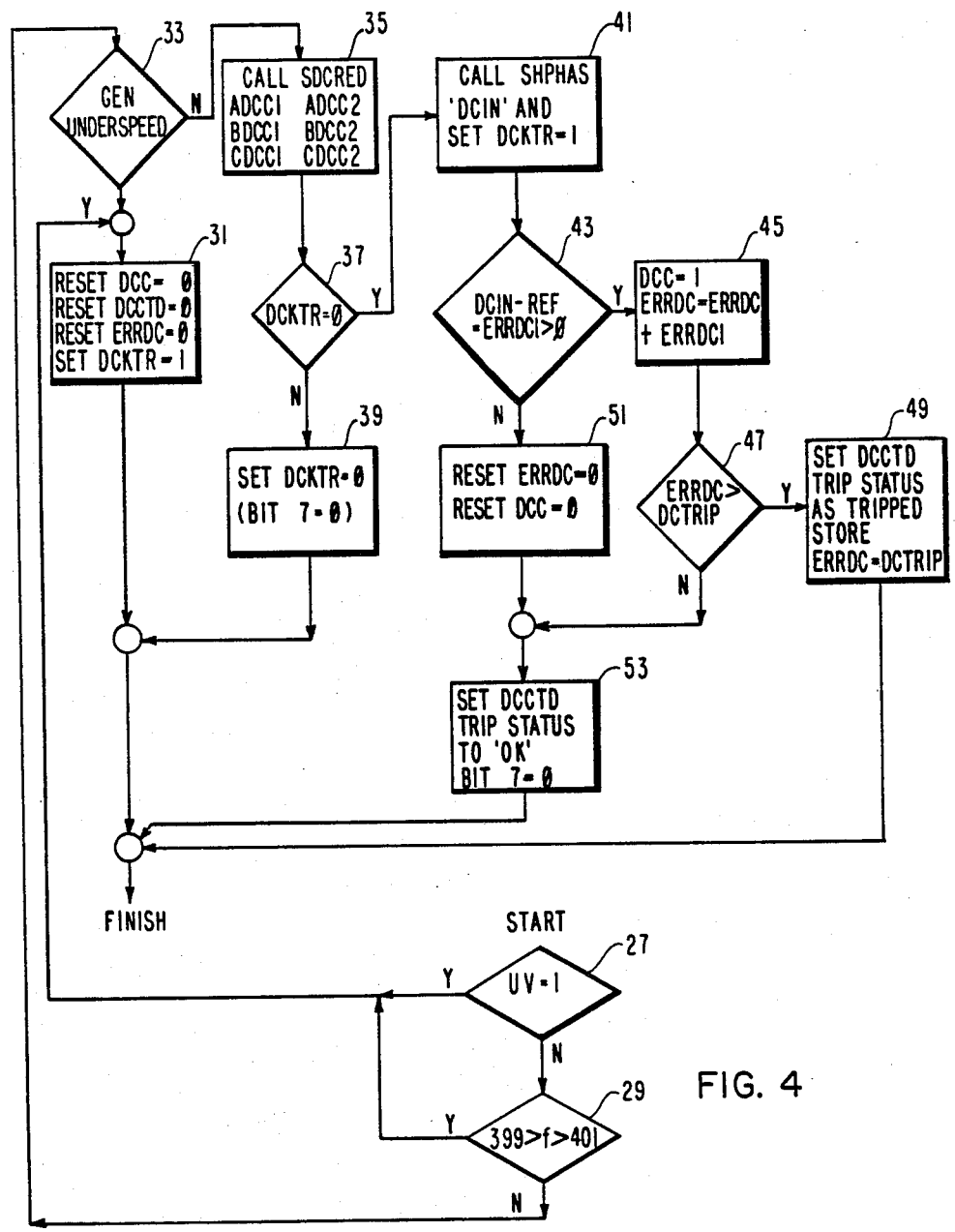
FIGS. 4 through 6 are flow charts illustrating the operation of the portion of the inverter system illustrated in FIG. 2.
Figure 5:
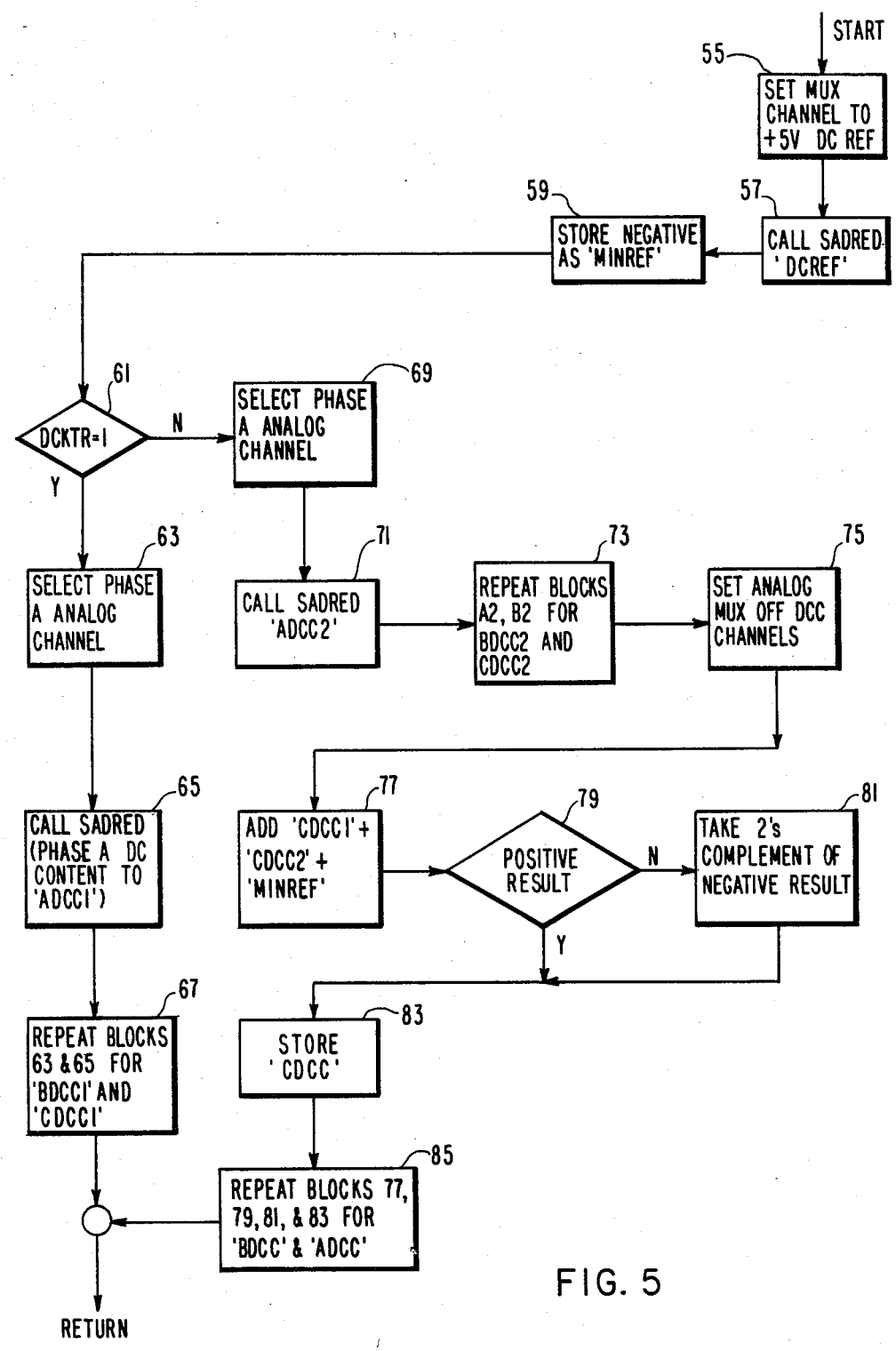
Figure 6:
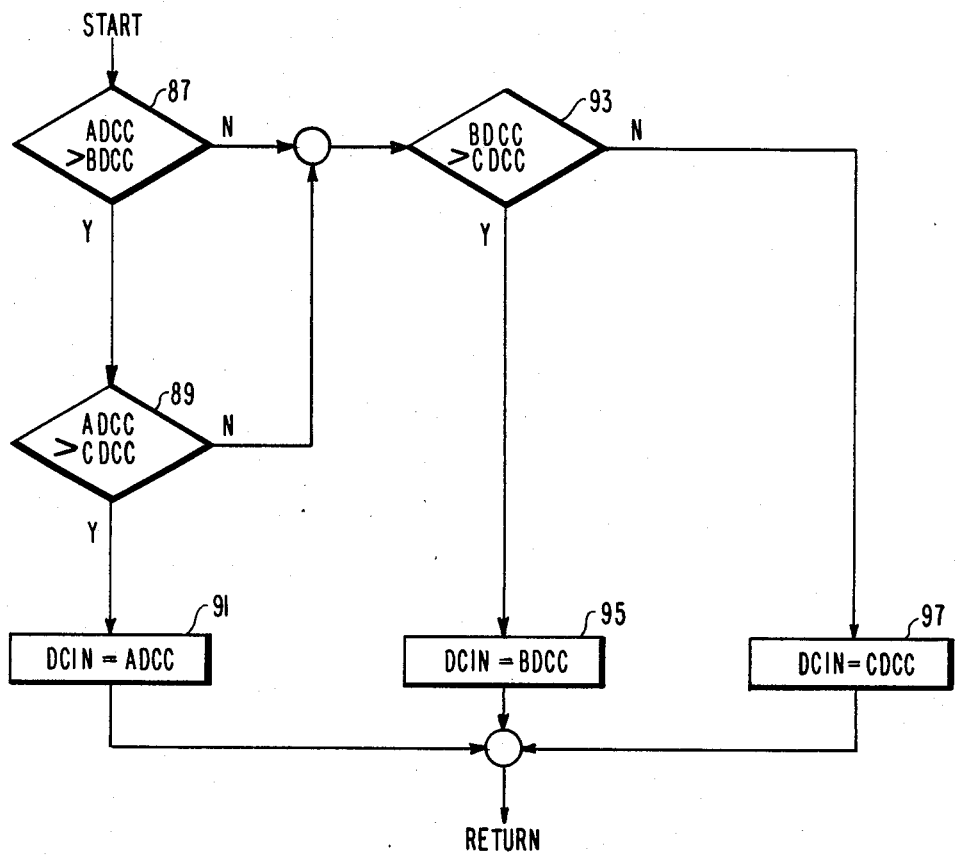

The flow charts setting forth the program under which the microprocessor 25 controls the measurement and storage of the two instantaneous values of each phase of the inverter output voltage and generates the generator trip signal are illustrated in FIGS. 4 through 6. The main routine for accomplishing these tasks is the DC content trip delay routine (RDCCTD) set forth in FIG. 4. The operating program of the computer system is set up to generate an interrupt every 8.75 milliseconds. The RDCCTD routine of FIG. 4 is always the first routine which is run after the interrupt so that the routine is run every 7 half-cycles of the inverter output waveform.

The RDCCTD routine of FIG. 4 begins by checking for an undervoltage condition in block 27 and for an off frequency condition in block 29. If either of these conditions are found to exist as determined by other routines which form part of the generator control unit program, the RDCCTD routine is not run except that a number of memory references are initialized in block 31 before the routine is exited. Even if the inverter output voltage and frequency are within limits, the RDCCTD routine is not run, again except for initializing selected memory references, if a generator underspeed condition exists as indicated by block 33.

Assuming that all the preconditions are met, the RDCCTD program of FIG. 4 calls the DC Content Read subroutine (SDCRED) of FIG. 5 as indicated in block 35 of FIG. 4. This subroutine, on the first time through, reads and stores the instantaneous value of each of the 3 phases of the inverter voltage and the +5 volt signal used to generate the bias voltage. Upon returning to the RDCCTD routine, the DC counter is checked in block 37 to determine whether the first or second voltage measurements were just taken. On the first time through the program, DCKTR will equal 1 but is set equal to zero in block 39 before the routine is exited.

Following the generation of the next interrupt, the RDCCTD routine will again be entered and this time when the SDCRED subroutine is called up in block 35, the second measurement of each of the 3 inverter phase voltages is read into the computer system and the DC content of each phase is determined in a manner to be discussed below. This time when RDCCTD is reentered, DCKTR equals zero as determined in block 37 and the High Phase subroutine, SHPHAS, is entered and DCKTR is reset to one as indicated in block 41. As discussed in more detail below, the SHPHAS subroutine determines which phase has the highest DC content and sets DCIN equal to this value1. Upon return to the RDCCTD routine, this highest DC content value is compared with a threshold value in block 43 by subtracting a reference signal REF from DCIN to generate a DC error signal ERRDCI. For purposes of illustration, this reference value was set at 190 millivolts in the system under discussion.

If at block 43 of FIG. 4 ERRDCI exceeds zero, indicating that the highest value of the DC content exceeds the threshold value, DCC is set equal to 1 in block 45 to indicate this, and ERRDC, the accumulated value of DC content which exceeds the threshold value is increased by ERRDCI. Since this calculation is made every 8.75 milliseconds, this operation results in integration of the error. If the accumulated error, ERRDC, exceeds a predetermined amount, DCTRIP, as determined in block 47, the trip status, DCCTD, is set at "trip" in block 49. ERRDC is then made to DCTRIP to complete the routine. As an example, 600 millivolt-seconds was selected for the predetermined amount, DCTRIP, in the system being described. If the highest DC content does not exceed the reference value as determined in block 43, the accumulated error ERRDC and DCC are set equal to zero in block 51 and DCCTD, the trip status, is set equal to "OK" in block 53 to complete the routine. Similarly, if the accumulated value of the highest DC content over the threshold value does not exceed the predetermined amount as determined in block 47, DCCTD is also set to "OK" in block 53 to complete the routine.

The DC read subroutine, SDCRED, which is entered at block 35 of the RDCCTD routine is shown in detail in FIG. 5. As the first step in this subroutine, the multiplexer 17 is set to read the +5 v DC reference signal as indicated in block 55. A subroutine SADRED is then entered in block 57 which directs the sample and hold circuit 21 to sample the +5 v DC reference, and activates the analog to digital converter to convert the reference voltage into a digital signal, DCREF. The negative of DCREF is then taken, for reasons which will become evident from the discussion below, and stored as MINREF (minus reference) as shown in block 59. Next, the status of DCKTR is checked in block 61 to determine whether the measurement to be taken is the first or the second. If DCKTR equals 1, the phase A channel on the multiplexer 17 is selected in block 63 and the SADRED subroutine is called in block 65 to convert the first phase A DC content measurement into a digital signal which is stored as ADCCI. The steps of blocks 63 and 65 are repeated as indicated in block 67 to store the first measurements of the phase B and C DC content as "BDCCI" and "CDCCI" before the program returns to block 37 in FIG. 4.

On the second run of the SDCRED subroutine of FIG. 5, DCKTR equals zero in block 61 and therefore the steps of blocks 69, 71 and 73 are performed to input the second measurement of the phase A, B and C DC content in digital form in the same manner as the first measurements were made in blocks 63, 65, and 67. The elapsed time from the start of the RDCCTD routine to the taking of the DC content measurements is the same for the first and second measurements. Therefore, since the RDCCTD routine is repeated every 8.75 milliseconds, the first and second DC content measurements are taken 8.75 milliseconds, or 7 half-cycles of the 400 hertz output voltage, apart. After the last measurement and digital conversion is made, control is removed from the analog multiplex DC channels which allows the sample and hold circuit to discharge as indicated in block 75.

The determination of the DC content for phase C of the inverter output is made in block 77 of FIG. 5 by adding CDCC1, and CDCC2 and 'MINREF', together. 'MINREF' it will be recalled, is the negative of the +5 volt reference signal used to generate the 2.5 volt bias. The effect of the calculation in block 77 is to subtract the 2.5 volt bias from each of the phase C DC content readings and determine their sum. The bias voltage is selected such that the sampled voltages are always positive to simplify this calculation as well as to simplify the analog to digital conversion as mentioned above. While the average value of the phase C DC content could be determined by dividing the resultant of the block 77 calculation by 2, division is a time consuming operation and is not really necessary. Instead, the threshold value, which the highest DC content DCIN is compared with in block 43 of FIG. 4, is merely doubled as is the integrated DC content error which trips the generator, DCTRIP in block 47. Next, the polarity of the resultant of the block 77 calculation is checked in block 79 and if it is negative the 2's complement is taken in block 81 to convert it to a positive number. The effect of the operations of blocks 79 and 81 is to determine the absolute magnitude of the block 77 calculation which is then stored in block 83 as CDCC. BDCC and ADCC are determined in a similar manner in block 85 to complete the SDCRED subroutine.

The flow diagram for the SHPHAS (High Phase) subroutine which is called up in block 41 of FIG. 4 is set forth in FIG. 6. In this subroutine the absolute magnitudes of the DC contents of the three phases as determined in the SDCRED subroutine of FIG. 5 are compared and DCIN is set equal to the DC content of the highest magnitude. Accordingly, DCIN is set equal to ADCC in block 91, if ADCC greater than both BDCC and CDCC as determined in blocks 87 and 89 respectively. If ADCC is not greater than either BDCC or CDCC, these latter quantities are compared in block 93 with DCIN being set equal to BDCC if in block 95 BDCC is greater. Otherwise, DCIN is set equal to CDCC in block 97.

The disclosed concept uses the microprocessor to do the majority of the amplifying, filtering, level shifting, threshold detection and time delaying required in DC content sensing. The result is DC content sensing at a significantly reduced cost and with a significant reduction in the complexity of the apparatus required. Furthermore, the microprocessor allows for flexibility in setting and adjusting system parameters.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A method for determining the DC content of a plural phase periodically time varying waveform including:
   successively measuring the instantaneous value of each phase of the waveform at a first point in each phase,
   storing signals representative of said first instantaneous value of each phase of the waveform,
   successively measuring the instantaneous value of each phase of said plural phase waveform at respective second points each spaced substantially an exact odd number of half-cycles of said waveform from the respective first point, wherein said instantaneous values of each phase of said waveform at said first and second points are equally and oppositely displaced from the midvalue of the associated phase of said waveform,
   storing signals representative of the instantaneous value of each phase of the waveform at each of said respective second points,
   generating a signal equal to the DC content of each phase by averaging the signals representative of the instantaneous value of the associated phase of the waveform at said associated first and second points,
   selecting the largest one of said DC content signals,
   comparing said largest one of said DC content signals with a preselected threshold signal level, and
   generating an output signal if said largest one of said DC content signals exceeds said threshold signal level.

2. The method of claim 1 wherein said first point is a random point in the waveform.

3. The method of claim 1 including the step of integrating said output signal and generating a second output signal when the integrated output signal exceeds a selected amount.

4. The method of claim 1 including the step of at least partially filtering the waveform prior to measuring said instantaneous values.

5. The method of claim 4 including the step of first adding a bias voltage to the waveform, said bias voltage being of sufficient magnitude to assure that the first and second instantaneous values will all be of the same polarity, and wherein the averaging step includes adding the two biased instantaneous values together and subtracting a signal representing twice the bias voltage from the sum.

6. Apparatus for determining the DC content of a multiple phase periodically time-varying waveform comprising:
   means for measuring the instantaneous value of each phase of the waveform;
   means for storing said instantaneous value;
   control means for operating the measuring means to successively measure the instantaneous value of each phase of the waveform at a first point in a cycle of the waveform and to store the same in the storage means, for subsequently operating the measuring means to measure the instantaneous value of each phase of the waveform at a second point in time spaced from the first point by a substantially exact odd number of half-cycles of the associated phase of the waveform, wherein said instantaneous values of said waveform at said first and second points are equally and oppositely displaced from the midvalue of said waveform, for storing the measured values in said storage means and for generating a DC content signal for each phase by averaging said first and second instantaneous values;
   means for generating a threshold signal;
   means for comparing the largest one of said DC content signals with said threshold signal; and
   means for generating an output signal if said largest one of said DC content signals exceeds said threshold signal.

7. The apparatus of claim 6 wherein said measuring means includes a multiplexer and a sample and hold circuit and wherein said control means includes means for operating said multiplexer to successively apply each phase of the AC waveform to the sample and hold circuit.

8. Apparatus for generating a signal representative of the DC content of a multiple phase periodically time-varying waveform comprising:
   a sample and hold circuit;
   an analog to digital converter;
   a multiplexer; and
   a digital processor for operating said multiplexer to successively apply to the sample and hold circuit, the instantaneous value of each phase of the waveform at a first point in time, for operating the analog to digital converter to convert the instantaneous value of each phase of the waveform into a digital signal, for storing said digital signal, for operating said multiplexer to successively apply to the sample and hold circuit, the instantaneous value of each phase of the waveform at a second point in time respectively spaced from said first point by substantially an exact odd number of half-cycles of said waveform, wherein said instantaneous values of said waveform at said first and second points are equally and oppositely displaced from the midvalue of said waveform, operating said analog to digital converter to convert the second instantaneous value into a digital signal, for averaging said first and second signals for each phase to generate a signal representative of the DC content of each phase of the waveform, for selecting the largest one of said DC content signals, for comparing the largest one of said DC content signals with a preselected threshold signal level, and for generating an output signal if said largest one of said DC content signals exceeds said threshold signal level.

* * * * *